June 21, 1960     H. N. NERWIN     2,942,178
TESTING CIRCUIT
Filed July 12, 1957
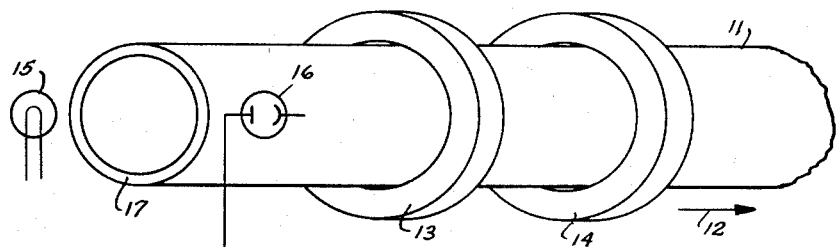
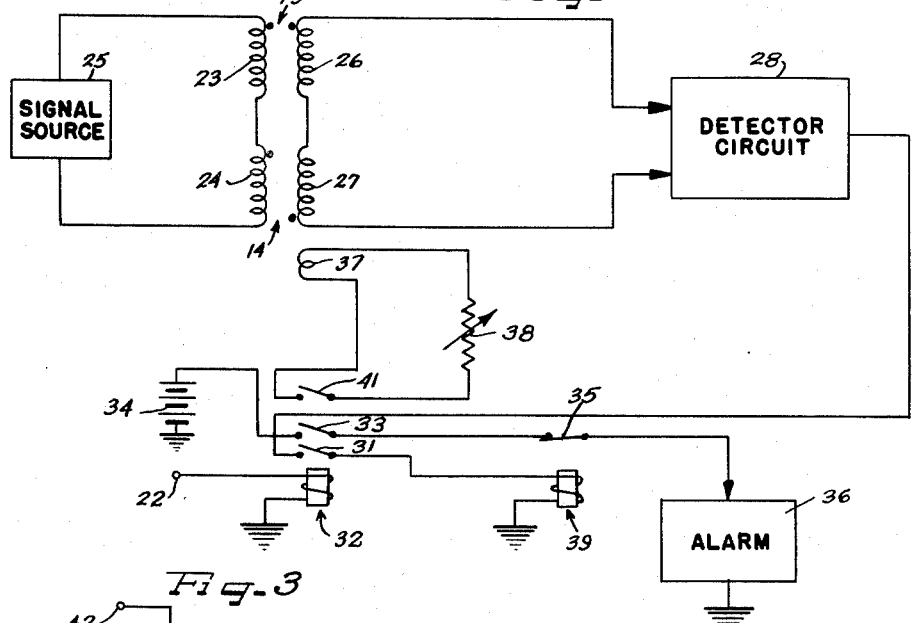
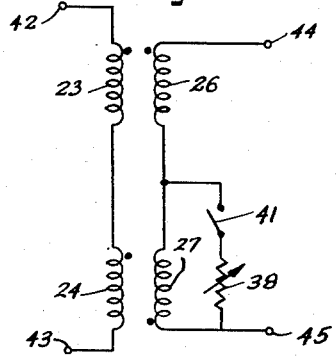
Inventor
HENRY N. NERWIN
by Hill, Sherman, Meroni, Gross & Simpson Attys.

United States Patent Office 2,942,178
Patented June 21, 1960

2,942,178

TESTING CIRCUIT

Henry N. Nerwin, Chicago, Ill., assignor to Magnaflux Corporation, Chicago, Ill., a corporation of Delaware Filed July 12, 1957, Ser. No. 671,566

2 Claims. (Cl. 324—40)

The present invention relates in general to testing circuits and more particularly concerns an automatic checking circuit for use with an eddy current inspection or testing system utilizing a balanced transformer detecting system during an interval between testing articles, a controlled unbalance is automatically introduced into the system for checking detector operation. If the detector fails to indicate an unbalance during this interval, an alarm condition is automatically indicated. Thus, the system is frequently monitored for proper operation without interfering with the normal testing routine.

An eddy current testing system is especially useful for detecting flaws in metallic structures, such as cylindrical pipes. In a typical system of this type, the pipe under test is continuously passed through the center of each of a pair of balanced transformers axially spaced relative to the pipe axis. The primaries of the transformers are serially-connected and energized with an alternating current signal. The secondaries are serially-connected in a sense whereby the signal derived across each in response to the alternating signal applied across the primary windings tend to cancel. When the magnitude of the two secondary signals are equal, no signal appears across the serial combination. Since both transformers are constructed in substantially the same manner, when there is no pipe in the air gaps, the resultant signal derived across the secondaries is substantially zero. This condition is retained when the pipe passes through transformer coil centers as long as the characteristics of the pipe region passing through one transformer coil center is substantially the same as the region passing through the other since eddy current losses load each transformer to the same extent. However, when there is a flaw in the pipe wall, there will be a change in the eddy current losses introduced by that portion of the wall and the signal derived across the secondary of the associated transformer is altered accordingly, thereby introducing an unbalance which results in a signal across the serially-connected secondaries of magnitude related to the degree of unbalance.

Should the signal to the primary be interrupted or an open circuit develop in any of the windings, then the signal derived across the serially-connected secondary windings would continue to be zero, even if a flaw were then passing within one of the transformer centers.

The present invention contemplates and has as a primary object the provision of means for automatically testing the erroneous indication of an output signal without interrupting the routine inspection of the eddy current testing system.

Another object of the invention is the provision of means for giving an alarm indication when improper operation of the detecting system is sensed.

Still another object of the invention is the achievement of the foregoing objects by the addition of a few relatively inexpensive components to an existing eddy current testing system.

According to one aspect of the invention, an additional winding is added to one of the transformers. In response to an indication that inspection of the entire length of pipe is complete, means are provided for connecting a selected resistance across the additional winding, thereby loading the associated transformer and imparting a selected degree of unbalance to which the detector circuit responds, if operating properly. If the detecting circuit fails to respond to the unbalance thus introduced, means are provided for actuating an alarm indication.

In another form of the invention, the desired unbalance is effected by selectively connecting a resistor across one of the secondary windings.

Other features, objects, and advantages of the invention will become apparent from the following specification when read in connection with the accompanying drawing in which;

Fig. 1 is a combined block-pictorial diagram illustrating the relation of the pipe being inspected to the transformers and the photoelectric cell system which indicates when inspection of a particular length of pipe is complete;

Fig. 2 is a block-schematic circuit diagram of an eddy current testing system utilizing an additional winding on one transformer in the automatic checking circuit; and Fig. 3 is a schematic circuit diagram a portion of the circuit represented in Fig. 2, but with the desired unbalance obtained by selectively connecting a resistor across one of the secondary windings.

With reference now to the drawing and more particularly Fig. 1 thereof, there is illustrated a pipe 11 moving along a direction indicated by arrow 12 for scanning by balanced transformers 13 and 14. A light source 15 energizes a photocell 16 when the end 17 of pipe 11 no longer interrupts the path of light between light source 15 and photocell 16. Photocell circuit 21 provides an output signal on terminal 22 when photocell 16 is energized, thereby indicating the end of scanning pipe 11 for defects.

Having described the physical relationship of the transformers in a typical system and the means for indicating inspection of a length of pipe is complete the electrical circuit arrangement which enables the operation of the detector circuit to be automatically checked during the interval a pipe is not being scanned for flaws will be described.

A description of the circuit arrangement will precede a discussion of its mode of operation. Referring to Fig. 2 there is illustrated a combined block-schematic circuit diagram of such a system. In describing Fig. 2 as well as Fig. 3, reference numerals which designate corresponding elements in previously described portions of the drawings are retained.

The primaries 23 and 24 of transformers 13 and 14 respectively are serially-connected and energized with an alternating current signal from signal source 25. The secondaries 26 and 27 respectively of the latter transformers are serially-connected in the sense indicated by the dots and the ends opposite the common connection are connected to the input of detector circuit 28.

In Fig. 2 the relays are represented in their normal position with the associated solenoid deenergized. The output of detector circuit 28 is connected through relay arm 31 when the associated solenoid 32 is energized, the solenoid 32 being energized by a signal from output terminal 22 of photocell circuit 21 (Fig. 1). When solenoid 32 is energized and solenoid 39 deenergized, battery 34 is connected through relay arms 33 and 35 to alarm 36. The latter alarm may be a bell, light, or other indicating device. An additional winding 37 is associated with transformer 14 and a variable resistor 38 connected across the latter when relay arm 41 is closed.

Having described the circuit arrangement its mode of operation will be discussed. During normal operation as a flaw detector, signal source 25 emits an alternating current signal which, in the absence of a flaw, induces voltages of equal magnitude and opposite phase across secondary windings 26 and 27. Thus detector circuit 28 responds to the resultant zero voltage derived across the serially-connected windings by indicating the absence of a flaw. When a flaw in the pipe is detected, there is a change in eddy current losses in the vicinity of the flaw, and the voltage across the secondary of the transformer proximate to the flaw changes accordingly, thereby producing an unbalance which is sensed by detector circuit 28 to provide an output signal which is indicative of a fault. The particular form of detector circuit 28 is not a part of this invention and may, for example, include a voltage sensitive relay which moves its associated arm position when the magnitude of voltage across the associated solenoid exceeds a predetermined level.

According to the invention, once scanning of the pipe for flaws is complete, a predetermined degree of unbalance is deliberately introduced and failure of the detector circuit 28 to respond to this unbalance is indicated by an alarm response. Referring again to Fig. 1, when the scanning of the pipe 11 is complete, the line of transmission between light source 15 and photocell 16 is no longer interrupted, photocell 16 is energized and photocell circuit 21 provides an output potential on terminal 22 indicative thereof.

Referring to Fig. 2, the potential on terminal 22 energizes solenoid 32, thereby closing arms 31, 33 and 41. The closing of relay arm 41 connects the variable resistance 38 across the additional winding 37 to introduce additional losses to transformer 14 whereby the magnitude of voltage across secondary 27 is less than that across secondary 26. The unbalance thus produced is sensed by detector circuit 28, when operating normally, to provide a potential which is coupled through relay arm 31 to energize solenoid 39, thereby opening relay arm 35 and preventing the potential across battery 34 from activating an indication from alarm 36. Should detector circuit 28 fail to respond to the unbalance introduced, then solenoid 39 is not energized, relay arm 35 remains closed and the potential from battery 34 coupled to alarm 36 activates an alarm indication from the latter.

Variable resistance 38 can be adjusted to provide substantially any desired degree of unbalance. Normally, this adjustment is made to provide an unbalance which corresponds with the desired minimum degree of unbalance for producing a response from detector circuit 28. When a new pipe is inserted for testing, the path between light source 15 and photocell 16 is interrupted, solenoid 32 is deenergized and arms 31, 33 and 41 opened, thereby disabling the testing circuit.

With reference to Fig. 3 there is illustrated a variation of the circuit of Fig. 2 in which all the advantages of the latter circuit are retained, yet no additional winding is required, thereby permitting the automatic checking circuit to be connected to an existing eddy current testing system. Primaries 23 and 24 and secondaries 26 and 27 are serially connected as in Fig. 2. An alternating current signal is applied from signal source 25 across terminals 42 and 43 and terminals 44 and 45 are connected to the input of detector circuit 28. However, instead of variable resistance 38 being connected across an additional winding when relay arm 41 is closed, variable resistance 38 is directly connected across secondary winding 27 to introduce the desired unbalance without requiring the use of an additional winding.

It is important that the photocell 16 be so located that the testing operation is initiated while the pipe lies within both transformers, since a large degree of unbalance is produced when the end of the pipe passes the transformer 13, before reaching the transformer 14 and such a large degree of unbalance would provide no criterion as to the sensitivity of the detector circuit. It may be further noted that the photocell 16 may be part of a photocell assembly used to permit functioning of the detector circuit only when the pipe lies within both transformers.

Thus, by adding a few relatively inexpensive additional components, a malfunctioning of the detecting system may be obtained without interrupting the normal operation of the eddy current testing system. Furthermore when a malfunction is detected, an alarm is automatically activated.

The specific embodiments described herein are exemplary only. It is apparent that those skilled in the art may make numerous modifications of and departures from these specific structures without departing from the inventive concepts. Consequently, the invention is to be construed as limited only by the spirit and scope of the appended claims.

I claim as my invention:

1. In a system for sensing variations in a physical characteristic of a test piece, an electrical test unit arranged to be disposed in a position adjacent said test piece for producing an output signal proportional to deviations in a physical characteristic of the test piece from a certain value, a detector circuit responsive to said output signal, sensing means responsive to movement of said test unit relative to said test piece to a position away from said position, an alarm device, a first circuit operable to produce a certain output signal from said test unit, a second circuit operable to apply an energizing signal to said alarm device, a third circuit for preventing operation of said alarm device in response to an output signal from said detector circuit of predetermined magnitude, and means controlled by said sensing means for simultaneously rendering said first, second and third circuits operable.

2. In a system for comparing the physical characteristics of test pieces a source of alternating current, primary transformer winding means connected to said source and inductively coupled to both of said test pieces to induce alternating magnetic fields in regions occupied by said test pieces, a pair of second winding means respectively coupled inductively to said test pieces to produce induced alternating electromotive forces proportional to the strengths of said magnetic fields, an indicating circuit, series circuit means connecting said secondary windings in phase opposition to said indicator circuit to produce an indication of differences in the electromotive forces induced in said secondary winding means and thereby an indication of differences in physical characteristics of the test pieces, resistance means, and means for coupling said resistance means to only one of said secondary winding means to produce a certain degree of unbalance in said series circuit means, said coupling means comprising an additional secondary winding inductively coupled to said one of said secondary winding means, and said resistance means being connected across said additional secondary winding References Cited in the file of this patent

UNITED STATES PATENTS

| | | |
|---|---|---|
| 1,851,818 | Drake | Mar. 29, 1932 |
| 2,074,742 | Drake | Mar. 23, 1937 |
| 2,415,789 | Farrow | Feb. 11, 1947 |